US006333973B1

(12) United States Patent
Smith et al.

(10) Patent No.: US 6,333,973 B1
(45) Date of Patent: *Dec. 25, 2001

(54) INTEGRATED MESSAGE CENTER

(75) Inventors: Colin Donald Smith, Ottawa; Brian Finlay Beaton, Orleans, both of (CA)

(73) Assignee: Nortel Networks Limited (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/842,020

(22) Filed: Apr. 23, 1997

(51) Int. Cl.[7] .......................... H04M 1/64; H04M 11/00; H04M 3/42; H04Q 7/20
(52) U.S. Cl. ................ 379/88.12; 379/67.1; 379/88.11; 379/88.22; 379/93.08; 455/412; 455/413; 455/466
(58) Field of Search .............................. 379/88.01, 88.11, 379/93.01, 93.08, 93.17, 100.01, 100.08, 88.22, 111, 112, 113, 211, 230, 246, 88.12, 114.06, 114.07, 88.23, 88.24; 455/445, 517, 417, 459, 419, 433, 466, 422, 38.1, 412, 413, 414; 370/347, 337, 349, 498, 524; 341/20–23

(56) References Cited

U.S. PATENT DOCUMENTS

| 5,228,029 | * | 7/1993 | Kotzin ................................. 370/95.1 |
| 5,283,638 | * | 2/1994 | Engberg et al. ....................... 348/14 |
| 5,327,486 | * | 7/1994 | Wolff et al. ............................ 379/96 |
| 5,533,102 | | 7/1996 | Robinson et al. ................. 379/88.25 |
| 5,557,659 | * | 9/1996 | Hyde-Thomson ...................... 379/88 |
| 5,568,540 | * | 10/1996 | Greco et al. ........................... 379/88 |
| 5,583,920 | * | 12/1996 | Wheeler, Jr. .......................... 379/88 |
| 5,608,786 | * | 3/1997 | Gordon ................................ 379/100 |
| 5,719,918 | * | 2/1998 | Serbetciouglu et al. ............... 379/58 |
| 5,742,905 | * | 4/1998 | Pepe et al. ............................ 455/461 |
| 5,794,142 | * | 8/1998 | Vantilla et al. ....................... 455/419 |
| 5,815,506 | * | 9/1998 | Gokhale ............................... 370/524 |
| 5,842,141 | * | 11/1998 | Vaihoja et al. ....................... 455/574 |

(List continued on next page.)

FOREIGN PATENT DOCUMENTS

| 0 630 141 | 12/1994 | (EP) . |
| 0 691 777 | 1/1996 | (EP) . |
| WO 96 15490 | 5/1996 | (EP) . |
| 8268227 | 10/1996 | (JP) . |

OTHER PUBLICATIONS

Hattori et al., "A Multimedia Intelligent Message Communication System for Distributed Coordination Environments," Electronics & Communications in Japan, Part 1—Communications, vol. 76, No. 1, Jan. 1, 1993, pp. 11–23.
"Nokia 9000 Communicator User's Manual," Nokia Corporation, 1996, pp. 1–1 through 16–1 (48 pages total).

*Primary Examiner*—Allan Hoosain
(74) *Attorney, Agent, or Firm*—Finnegan, Henderson, Farabow, Garrett & Dunner, L.L.P.

(57) ABSTRACT

An integrated message center operates on telecommunications equipment, having a display and a processor, to consolidate messages of different types for viewing and manipulation by a user. The telecommunications equipment receives notification messages corresponding to pending messages of different types and determines the message type of the pending messages. The integrated message center associates a message type indicator with each of the received notification messages based on the determined message type and displays on the display a portion of the received notification messages and the associated message type indicators as entries in a single selectable list. The user can select one of the pending messages for retrieval based on the entries in the single selectable list. In response to user selection, the integrated message center retrieves the selected pending message for viewing and manipulation by the user.

33 Claims, 16 Drawing Sheets

U.S. PATENT DOCUMENTS

| | | | |
|---|---|---|---|
| 5,870,549 | * | 2/1999 | Bobo, II .......................... 395/200.36 |
| 5,903,832 | * | 5/1999 | Seppanen et al. .................... 455/414 |
| 5,905,959 | * | 5/1999 | Foladare et al. ..................... 455/445 |
| 5,911,485 | * | 6/1999 | Rossman ................................. 34/22 |
| 5,966,663 | * | 10/1999 | Gleason ................................ 455/466 |
| 6,055,424 | * | 4/2000 | Tornqvist et al. .................... 455/414 |
| 6,205,139 | * | 3/2001 | Voit ...................................... 370/389 |

* cited by examiner

INTEGRATED MESSAGE CENTER

RELATED APPLICATIONS

This application is related to U.S. patent application, Ser. No. 08/842,015, entitled MULTITASKING GRAPHICAL USER INTERFACE; U.S. patent application, Ser. No. 08/841,485, entitled ELECTRONIC BUSINESS CARDS; U.S. patent application, Ser. No. 08/841,486, entitled SCROLLING WITH AUTOMATIC COMPRESSION AND EXPANSION; U.S. patent application, Ser. No. 08/842,019, entitled CLID WITH LOCATION ICON; U.S. patent application, Ser. No. 08/842,017, entitled CLID WITH DRAG AND DROP CAPABILITY; and U.S. patent application, Ser. No. 08/842,036, entitled ICONIZED NAME LIST, all of which were filed concurrently herewith, and all of which are hereby incorporated by reference.

BACKGROUND OF THE INVENTION

This invention relates to the field of message handling, and more specifically to the field of message presentation to a user by which messages of all types are consolidated and graphically displayed in a searchable list to allow for easy graphical scanning, prioritizing, editing, selection, viewing, forwarding, playback, and response by the user.

Traditionally, a user could retrieve only voice messages by calling and interacting with a voice mail service using dual tone multi-frequency (DTMF) commands. Such retrieval of messages, however, required the user to dial the voice mail service and listen to each message, or minimally the header of each message, that is, the name of the person and the time received. This type of voice mail retrieval tended to be a slow and tedious process.

Additionally, the user needed to memorize the DTMF number commands to control the voice mail service. Sometimes these commands were different for the user's home voice mail service and the user's office voice mail service. For example, the user needed to remember that pressing "1" with the office voice mail service, while pressing "6" with the home voice mail service, meant "play the message."

More recently, telephones have been designed with the capability to directly receive, or download, different types of messages, such as faxes, e-mail, and Short Messaging Service (SMS) messages. One conventional mobile telephone has a display, a keypad, and numerous hard keys, and uses menus to enable a user to view different types of received messages.

When a message arrives, an internal processor detects the message type and stores the message in a folder dedicated to the message type. If the telephone receives a fax, for example, the internal processor stores the fax in a fax folder.

When the user opens the cover to the display, the internal processor displays a note indicating the quantity and type of messages received. For example, if two faxes and two SMS messages have been received, the note will show "You have: 2 unread faxes and 2 unread short messages."

If the user wants to view a received message, the user first goes to the main menu and selects the type of message to view. This causes the internal processor to launch a message-type specific application to retrieve the message from the message folder and display it for the user. For example, if the user wants to read a received fax, the user selects "Received faxes" from the main menu. In response, the internal processor launches the fax application to display a list of received faxes. From the list, the user selects a particular fax to read. The fax application then displays the selected fax.

If the user then wanted to view a received SMS message, however, the user must return to the main menu to select "Received short messages." In response, the internal processor launches the SMS application to display a list of received SMS messages from which the user selects the desired one.

Telephones of this type, however, suffer from a number of drawbacks. First, they store in their internal memory all received messages, except voice and e-mail messages which are stored at an external server. This wastes precious memory space, and as a result, fewer messages can be locally stored.

Additionally, message handling is cumbersome because the telephones are menu driven and contain separate applications for the different message types. To view different types of messages, the user must follow a series of menus that cause specific applications to be executed.

Therefore, a need exists to integrate different types of messages from different types of equipment into one graphical location to notify the user of pending messages and their type, and to allow the user to view and respond to the messages by simple operation.

SUMMARY OF THE INVENTION

Systems and methods consistent with the present invention address this need by providing an integrated message center that graphically displays different types of received messages together to facilitate user viewing and manipulation of the messages without having to follow a series of menus or launch separate applications.

In accordance with the purpose of the invention as embodied and broadly described herein, an integrated message center consistent with the principles of the present invention operates on telecommunications equipment, having a display and a processor, to consolidate messages of different types for viewing and manipulation by a user. The telecommunications equipment receives notification messages corresponding to pending messages of different types and determines the message type of the pending messages.

The integrated message center associates a message type indicator with each of the received notification messages based on the determined message type and displays on the display a portion of the received notification messages and the associated message type indicators as entries in a single selectable list. The user can select one of the pending messages for retrieval based on the entries in the single selectable list. In response to user selection, the integrated message center retrieves the selected pending message for viewing and manipulation by the user.

BRIEF DESCRIPTION OF THE DRAWINGS

The accompanying drawings, which are incorporated in and constitute a part of this specification, illustrate systems and methods consistent with this invention and, together with the description, explain the objects, advantages and principles of the invention. In the drawings.

DETAILED DESCRIPTION OF THE PREFERRED EMBODIMENTS

The following detailed description of the invention refers to the accompanying drawings that illustrate preferred embodiments consistent with the principles of this invention. Other embodiments are possible and changes may be made to the embodiments without departing from the spirit and scope of the invention. The following detailed description does not limit the invention. Instead, the scope of the invention is defined only by the appended claims.

The integrated message center consistent with the principles of the present invention displays different types of received messages in a single display and permits manipulation of the messages by a user, such that the user can view, discard, forward, and respond to any type of message without the need to launch different applications.

I. System Architecture

Figure 1:
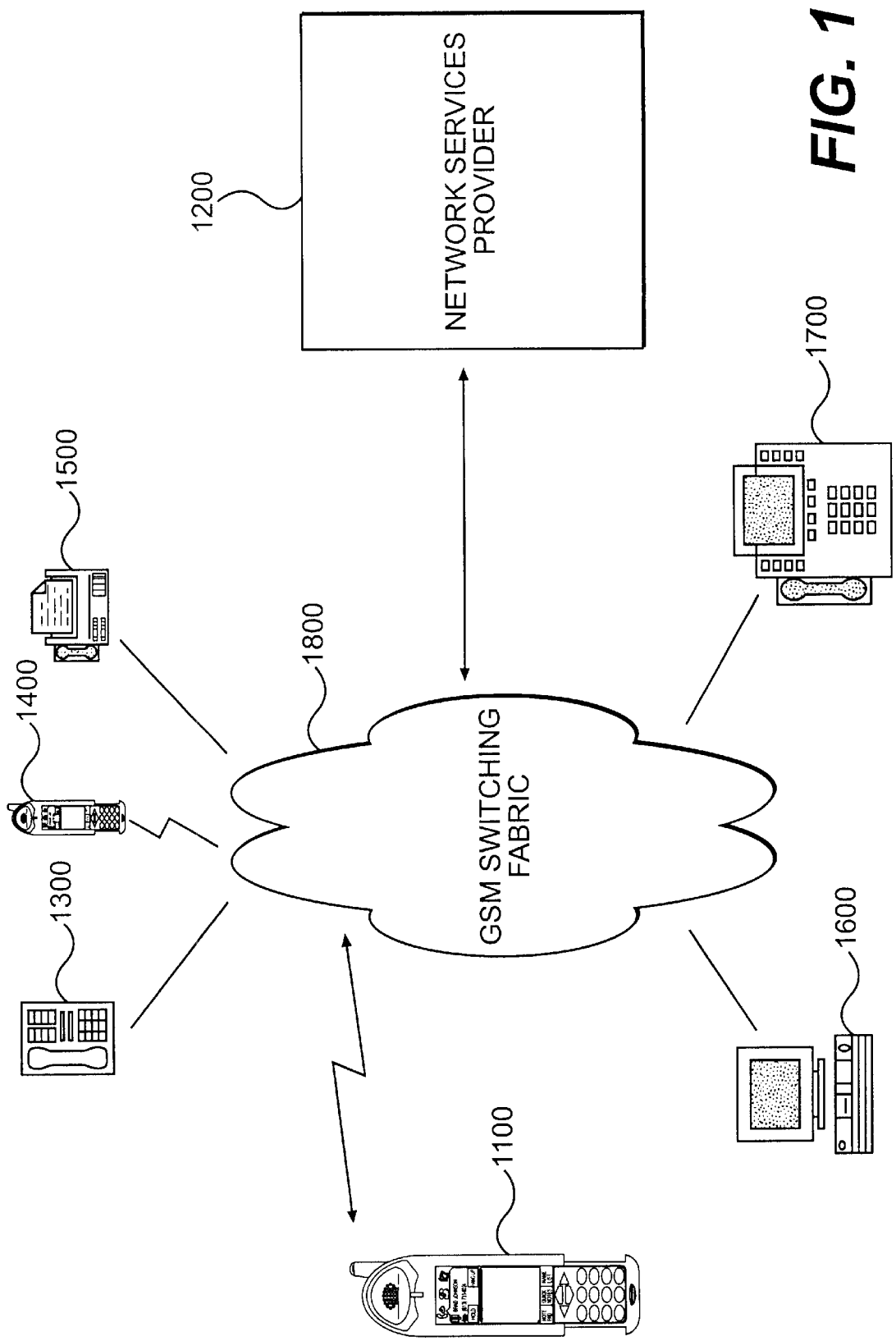
FIG. 1 is a diagram of a communications network containing the integrated message center consistent with the principles of the present invention.

FIG. 1 is a diagram of a communications network containing the integrated message center consistent with the principles of the present invention. The integrated message center is a logical entity that resides in mobile telephone 1100 and operates in conjunction with network services provider 1200 to inform a user of incoming and pending messages, such as fax mail, e-mail, voice mail, etc. The integrated message center also serves as a mechanism by which the user can retrieve, manipulate, and reply to all types of messages. User manipulation of the pending messages might include the ability to view, prioritize, edit, playback, discard, and/or forward messages.

The user uses mobile telephone 1100 to view messages from callers having different types of caller equipment, such as ordinary telephone 1300, caller mobile telephone 1400 which is similar to user mobile telephone 1100, facsimile equipment 1500, computer 1600, and Analog Display Services Interface (ADSI) telephone 1700. The callers leave different types of messages for the user, depending upon the type of caller equipment.

Network services provider 1200 stores many of the messages awaiting retrieval by the user and notifies the user of the pending messages. Subscriber mobile telephone 1100 and caller equipment 1300 through 1700 communicate with network services provider 1200 over a communications network, such as Global System for Mobile Communications (GSM) switching fabric 1800.

While FIG. 1 shows caller equipment 1300 through 1700 directly connected to GSM switching fabric 1800, this is not typically the case. Telephone 1300, facsimile equipment 1500, computer 1600, and ADSI telephone 1700 normally connect to GSM switching fabric 1800 via another type of network, such as a Public Switched Telephone Network (PSTN).

When a caller uses telephone 1300 to communicate with the user, the caller dials the telephone number corresponding to mobile telephone 1100. If the user does not answer the call for a predetermined number of rings, or upon direction of the user (to be described), the call routes to network services provider 1200 over GSM switching fabric 1800 by conventional mechanisms. Network services provider 1200 stores the message left by the caller as voice mail and sends a short message to mobile telephone 1100, notifying the user of the pending voice mail message.

When the caller uses caller mobile telephone 1400 to communicate with the user, the caller may either call the user, as described above with regard to telephone 1300, or may send the user a Short Messaging Service (SMS) message. GSM networks typically include an SMS server that provides the SMS service. The SMS service is an error-free, guaranteed delivery transport mechanism by which callers can send short point-to-point messages, i.e., SMS messages, through the GSM network, such as GSM switching fabric 1800, in a GSM signaling channel, simultaneously with, or without, a voice or data call.

GSM protocol limits the length of the standard SMS text message to a maximum of 140 bytes. However, GSM protocol permits longer messages to be formed by concatenating several messages together, transparent to the caller. Because GSM protocol transparently performs this concatenating of messages, the caller sees no restriction on message length.

If the caller chooses to send the user an SMS message, the caller inputs the message data, and selects a destination corresponding to the user. GSM switching fabric 1800 routes the message to an SMS server that services the area containing mobile telephone 1100, and the SMS server, in turn, relays the message to the user.

When the caller uses facsimile equipment 1500 to send a fax to the user, the caller dials the fax telephone number corresponding to network services provider 1200. The caller sends the fax to network services provider 1200. Network services provider 1200 stores the fax and then sends a short message to mobile telephone 1100, notifying the user of the pending fax.

When the caller uses computer 1600 to send an e-mail message to the user, the caller enters the message into the computer and affixes the user's e-mail address. The user's e-mail address directs the e-mail message to network services provider 1200. Network services provider 1200 stores the e-mail message, and then sends a short message to mobile telephone 1100, notifying the user of the pending e-mail message.

When the caller uses ADSI telephone 1700 to communicate with the user, the caller dials the telephone number corresponding to mobile telephone 1100, as described above with regard to telephone 1300. If the user does not answer the call for a predetermined number of rings, or upon direction of the user, the call routes to network services provider 1200 over GSM switching fabric 1800 by conventional mechanisms. Network services provider 1200 stores the message left by the caller as voice mail and sends a short message to mobile telephone 1100, notifying the user of the pending voice mail message.

Figure 2:
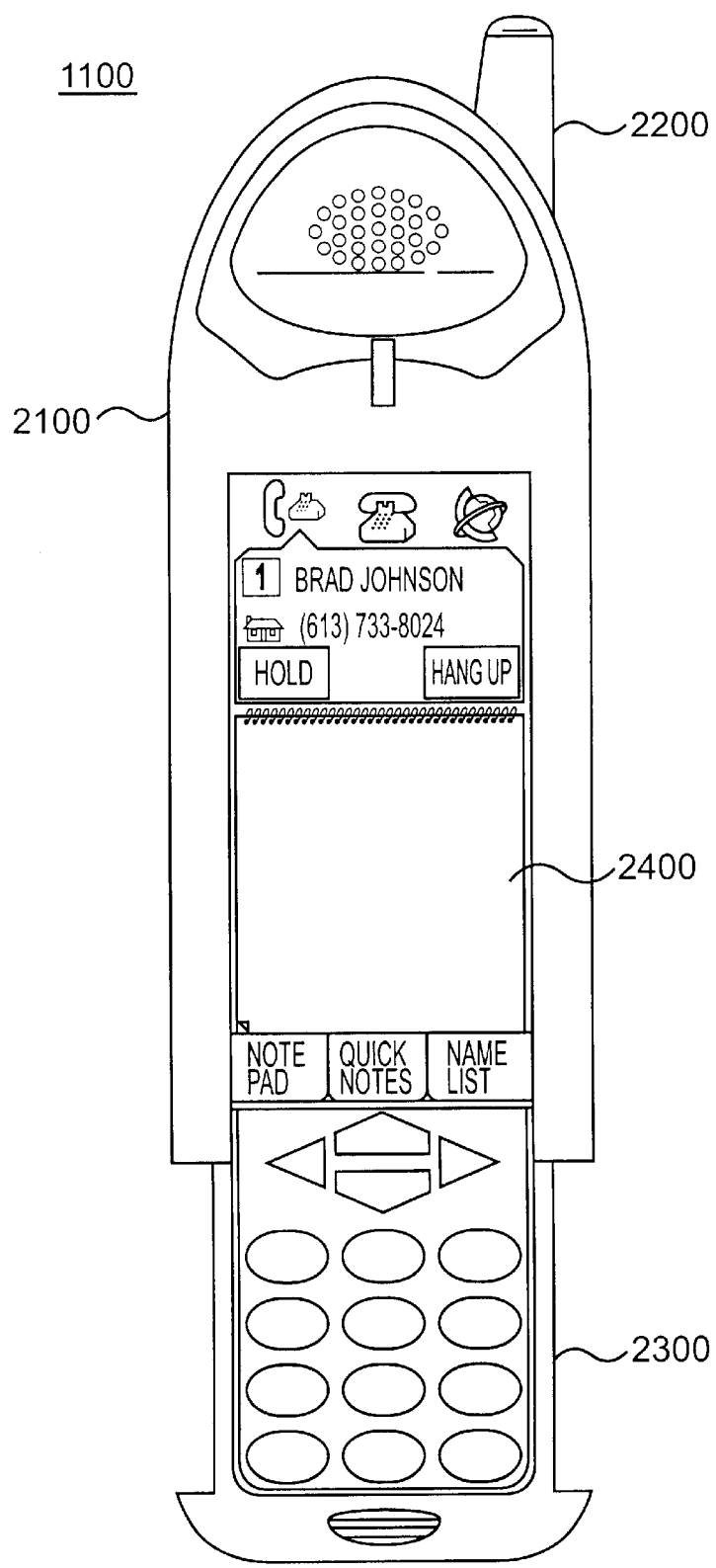
FIG. 2 is a diagram of the user mobile telephone operating in the network of FIG. 1.

Mobile telephone 1100 provides a user friendly interface to facilitate message retrieval, manipulation, and response by the user. FIG. 2 is a diagram of mobile telephone 1100, including main housing 2100, antenna 2200, keypad 2300, and display 2400.

Figure 3:
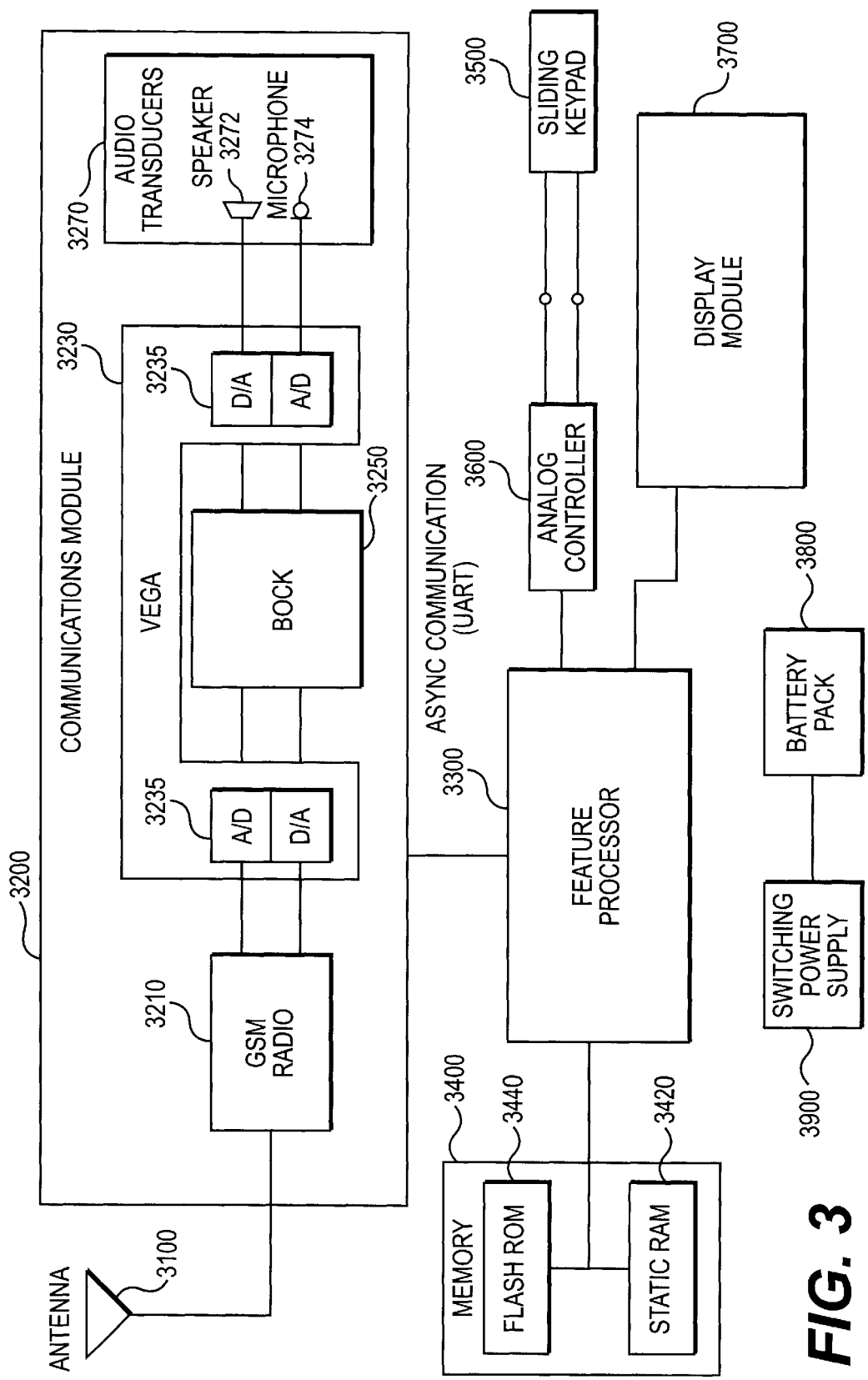
FIG. 3 is a block diagram of the elements included in the user mobile telephone of FIG. 2.

FIG. 3 is a block diagram of the hardware elements of mobile telephone 1100, including antenna 3100, communications module 3200, feature processor 3300, memory 3400, sliding keypad 3500, analog controller 3600, display module 3700, battery pack 3800, and switching power supply 3900.

Antenna 3100 transmits and receives radio frequency information for mobile telephone 1100. Antenna 3100 preferably comprises a planar inverted F antenna (PIFA)-type or a short stub (2 to 4 cm) custom helix antenna. Antenna 3100 communicates over GSM switching fabric 1800 using a conventional voice B-channel, data B-channel, or GSM signaling channel connection.

Communications module 3200 connects to antenna 3100 and provides the GSM radio, baseband, and audio functionality for mobile telephone 1100. Communications module 3200 includes GSM radio 3210, VEGA 3230, BOCK 3250, and audio transducers 3270.

GSM radio 3210 converts the radio frequency information to/from the antenna into analog baseband information for presentation to VEGA 3230. VEGA 3230 is preferably a Texas Instruments VEGA device, containing analog-to-digital (A/D)/digital-to-analog (D/A) conversion units 3235. VEGA 3230 converts the analog baseband information from GSM radio 3210 to digital information for presentation to BOCK 3250.

BOCK 3250 is preferably a Texas Instruments BOCK device containing a conventional ARM microprocessor and a conventional LEAD DSP device. BOCK 3250 performs GSM baseband processing for generating digital audio signals and supporting GSM protocols. BOCK 3250 supplies the digital audio signals to VEGA 3230 for digital-to-analog conversion. VEGA 3230 applies the resulting analog audio signals to audio transducers 3270. Audio transducers 3270 include speaker 3272 and microphone 3274 to facilitate audio communication by the user.

Feature processor 3300 provides graphical user interface features and a Java Virtual Machine (JVM). Feature processor 3300 communicates with BOCK 3250 using high level messaging over an asynchronous (UART) data link. Feature processor 3300 contains additional system circuitry, such as a liquid crystal display (LCD) controller, timers, UART and bus interfaces, and real time clock and system clock generators (not shown).

Memory 3400 stores data and program code used by feature processor 3300. Memory 3400 includes static RAM 3420 and flash ROM 3440. Static RAM 3420 is a volatile memory that stores data and other information used by feature processor 3300.

Figure 4:
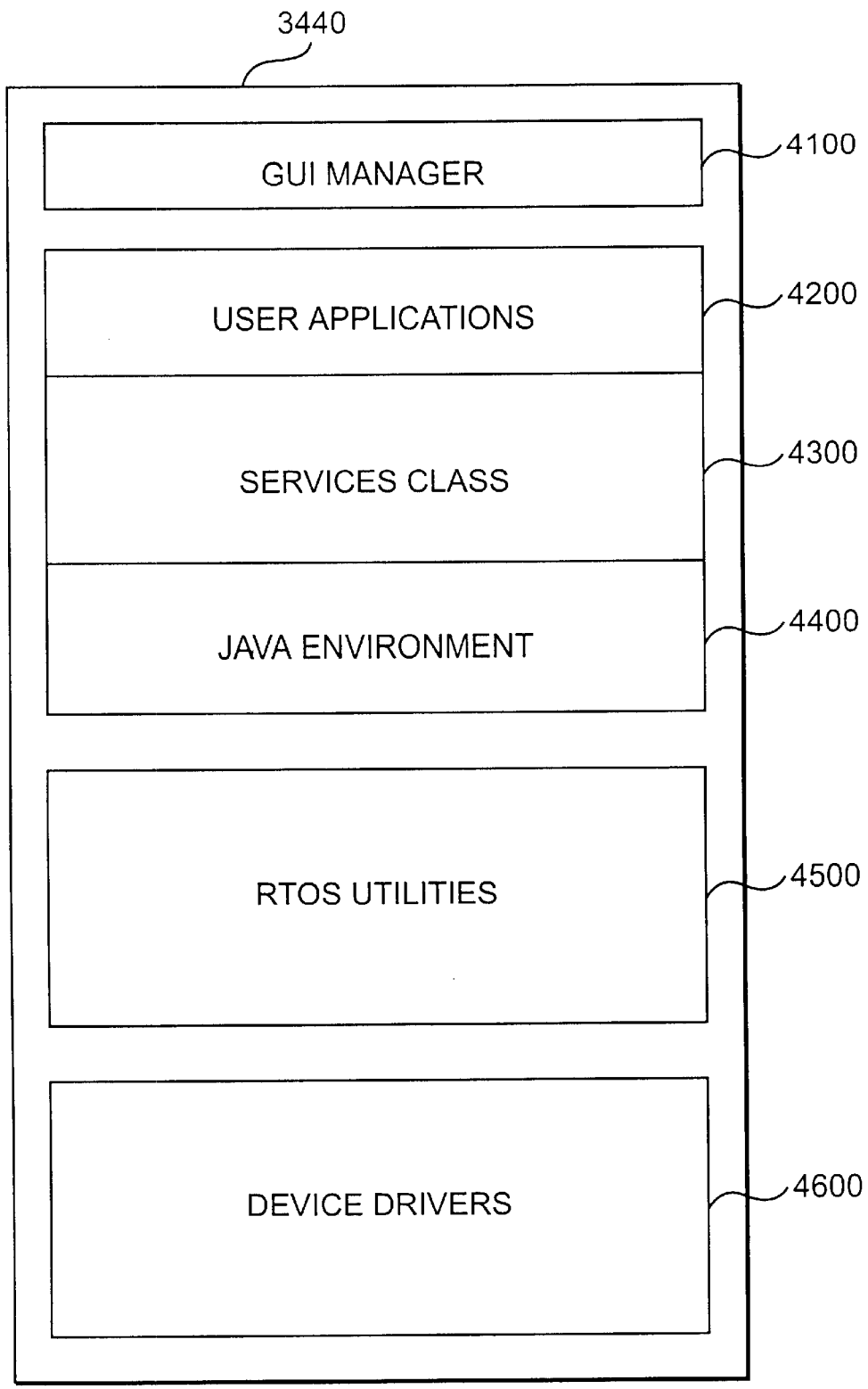
FIG. 4 is a block diagram of the software components stored in the flash ROM of FIG. 3.

Flash ROM 3440 is a non-volatile memory that stores the program code and directories utilized by feature processor 3300. FIG. 4 is a block diagram of the software components of flash ROM 3440. ROM 3440 includes graphical user interface (GUI) manager 4100, user applications 4200, service classes 4300, Java environment 4400, real time operating system (RTOS) utilities 4500, and device drivers 4600.

GUI manager 4100 acts as an application and window manager. GUI manager 4100 oversees the user interface by allowing the user to select, run, and otherwise manage applications.

User applications 4200 contain all the user-visible applications and network service applications. User applications 4200 preferably include a call processing application for processing incoming and outgoing voice calls, a message processing application for sending and receiving short messages, a directory management application for managing database entries in the form of directories, a web browser application, and other various applications.

Service classes 4300 provide a generic set of application programming facilities shared by user applications 4200. Service classes 4300 preferably include various utilities and components, such as a Java telephony application interface, a voice and data manager, directory services, voice mail components, text/ink note components, e-mail components, fax components, network services management, and other miscellaneous components and utilities.

Java environment 4400 preferably includes a JVM and the necessary run-time libraries for executing applications written in the Java™ programming language.

RTOS utilities 4500 provide real time tasks, low level interfaces, and native implementations to support Java environment 4400. RTOS utilities 4500 preferably include Java peers, such as networking peers and Java telephony peers, optimized engines requiring detailed real time control and high performance, such as recognition engines and speech processing, and standard utilities, such as protocol stacks, memory managers, and database packages.

Device drivers 4600 provide access to the hardware elements of mobile telephone 1100. Device drivers 4600 include, for example, drivers for sliding keypad 3500 and display module 3700.

Returning to FIG. 3, sliding keypad 3500 enables the user to dial a telephone number, access remote databases and servers, and manipulate the graphical user interface features. Sliding keypad 3500 preferably includes a mylar resistive key matrix that generates analog resistive voltage in response to actions by the user. Sliding keypad 3500 preferably connects to main housing 2100 (FIG. 2) of mobile telephone 1100 through two mechanical "push pin"-type contacts.

Analog controller 3600 is preferably a Phillips UCB1100 device that acts as an interface between feature processor 3300 and sliding keypad 3500. Analog controller 3600 converts the analog resistive voltage from sliding keypad 3500 to digital signals for presentation to feature processor 3300.

Display module 3700 is preferably a 160 by 320 pixel LCD with an analog touch screen overlay and an electroluminescent backlight. Display module 3700 operates in conjunction with feature processor 3300 to display the graphical user interface features.

Battery pack 3800 is preferably a single lithium-ion battery with active protection circuitry. Switching power supply 3900 ensures highly efficient use of the lithium-ion battery power by converting the voltage of the lithium-ion battery into stable voltages used by the other hardware elements of mobile telephone 1100.

Figure 5:
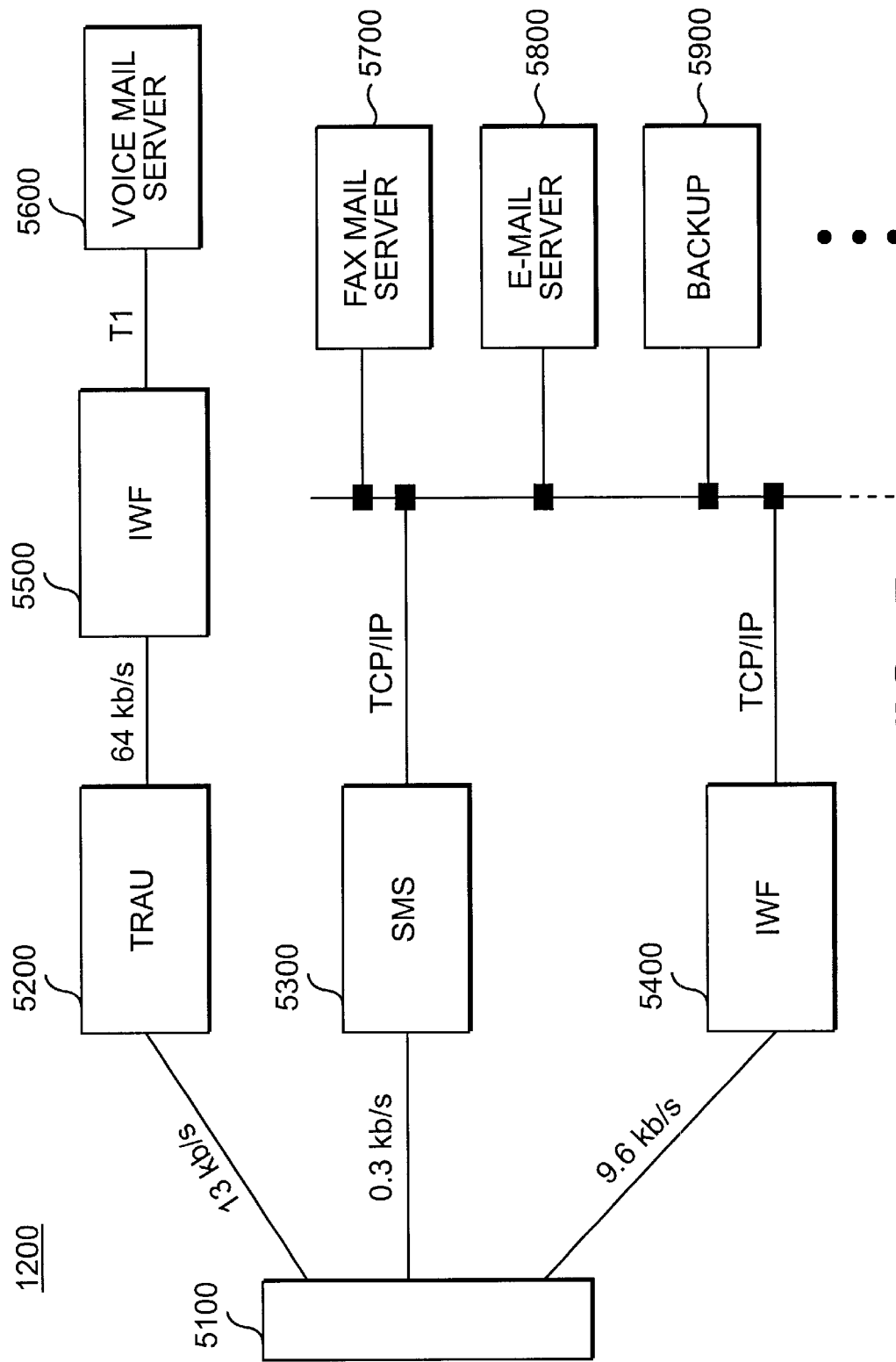
FIG. 5 is a block diagram of the elements included in the network services provider of FIG. 1.

These hardware elements of mobile telephone 1100 permit the user to communicate with network services provider 1200 (FIG. 1) to retrieve pending messages. FIG. 5 is a block diagram of the elements of network services provider 1200, including interface 5100, transcoder and rate adapter unit (TRAU) 5200, SMS server 5300, interworking function (IWF) servers 5400 and 5500, voice mail server 5600, fax mail server 5700, e-mail server 5800, and backup 5900.

Interface 5100 interfaces the elements of network services provider 1200 to GSM switching fabric 1800. TRAU 5200 performs GSM-specific speech encoding and decoding and rate adaption of voice signals received from mobile telephone 1100 for transmission to a destination network, such as a PSTN, and vice versa. TRAU 5200 is a conventional hardware device that converts, for example, voice signals to or from 64 kb/s pulse code modulated (PCM) and 13 kb/s RPE-LTP signals.

SMS server 5300 provides the SMS service for GSM switching fabric 1800. SMS server 5300 is a conventional hardware device that processes SMS messages. SMS server 5300 preferably relays SMS messages to or from mobile telephone 1100, and notifies the user of pending messages via SMS notification messages. SMS server 5300 transmits SMS messages, including notification messages, on mobile telephone 1100's GSM signaling channel, which is independent of mobile telephone 1100's voice and data B-channels.

IWF servers 5400 and 5500 convert data received from mobile telephone 1100 to a format suitable for transmission to a destination network. IWF servers 5400 and 5500 are conventional hardware devices that provide an interface between dissimilar networks.

IWF server 5400 connects to interface 5100. When the user exchanges data with a terminal in a PSTN, for example, IWF server 5400 provides a digital interface for transmission toward mobile telephone 1100 and a modem interface for transmission toward the PSTN. IWF server 5400 preferably handles conversions to or from transmission control protocol (TCP) and Internet protocol (IP). IWF server 5500 operates similar to IWF server 5400. IWF server 5500, however, connects to interface 5100 through TRAU 5200 and processes mainly voice data.

Voice mail server 5600 processes and stores voice messages for the user. When a caller leaves a voice message, voice mail server 5600 stores the message at a location corresponding to the user and informs SMS server 5300 of the pending message. Voice mail server 5600 also notifies SMS server 5300 of the identity and telephone number of the caller which voice mail server 5600 obtains from the caller's telephone signal or from a local database. Voice mail server 5600 might make this notification via a direct connection to SMS server 5300 (not shown), or might alternatively, make the notification via a modem connection.

In response to the notification from voice mail server 5600, SMS server 5300 formulates an SMS voice mail notification message to notify the user of the voice mail message. The voice mail notification message might include the caller's name and telephone number, a time and date stamp, and the name and address of voice mail server 5600.

Fax mail server 5700 processes and stores fax mail messages for the user. When a caller sends a fax, or fax mail message, to network services provider 1200 for the user, fax mail server 5700 stores the fax at a location corresponding to the user and again informs SMS server 5300 of the pending message and the identity and telephone number of the caller. SMS server 5300 formulates an SMS fax notification message to notify the user of the fax. The fax notification message might include the sender's name and telephone and/or fax number, a time and date stamp, and the name and address of fax mail server 5700.

Similarly, e-mail server 5800 processes and stores e-mail messages, and informs SMS server 5300 of the pending message and the identity of the caller. SMS server 5300, in turn, notifies the user of the pending message via an SMS e-mail notification message. The SMS notification message might include the sender's name, telephone number, and e-mail address, a time and date stamp, and the name and address of e-mail server 5800. Backup 5900 serves as a backup memory device that stores pending messages in the event of a failure in one of the servers.

II. System Processing

Figure 6:
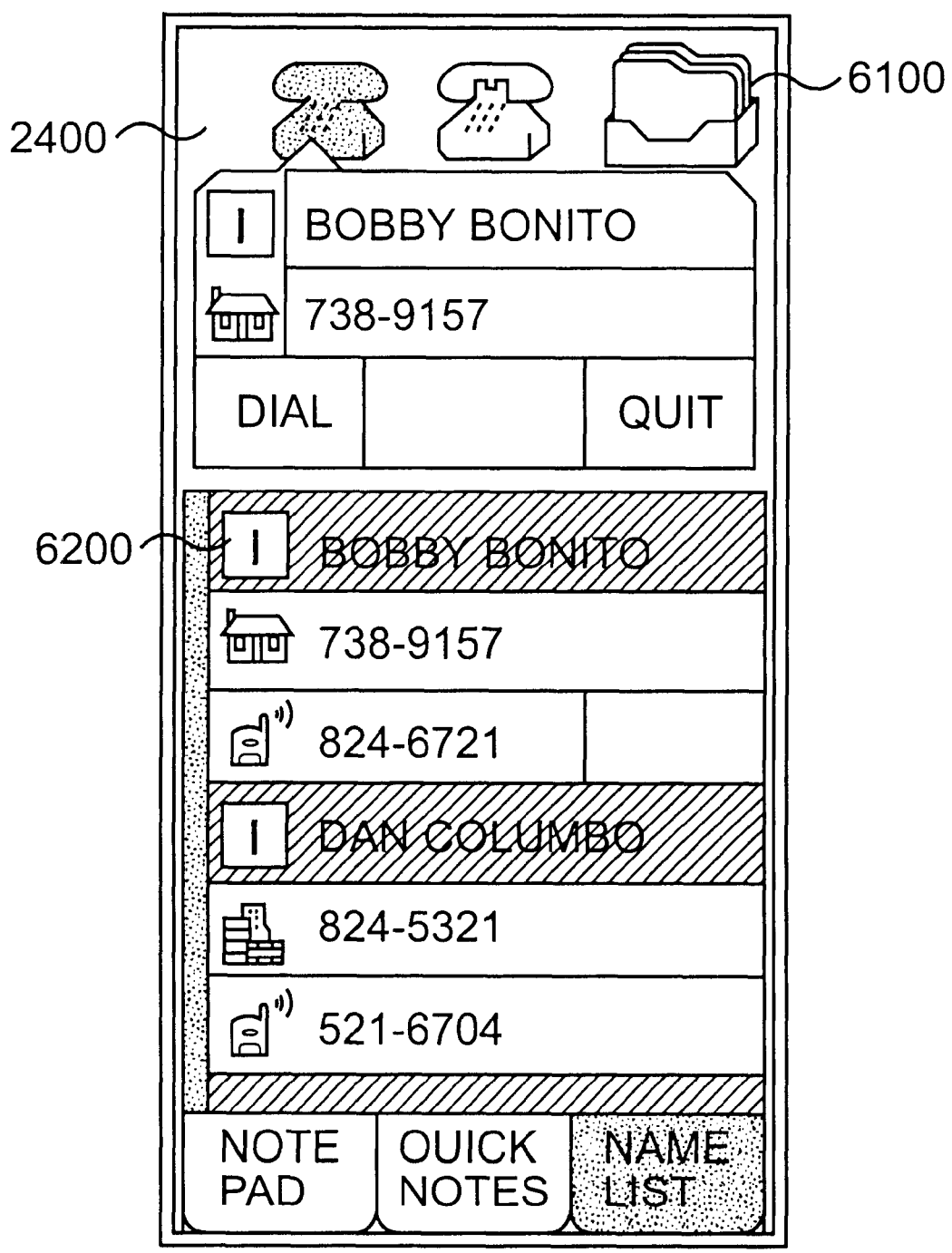
FIG. 6 is an example of an idle screen of the user mobile telephone shown in FIG. 2.

Mobile telephone 1100 provides a graphical user interface on display 2400 (FIG. 2) to facilitate management of the messages by the user. FIG. 6 is an example of an idle screen of display 2400 including various graphical icons and information, such as integrated message center 6100 and business card 6200.

Business card 6200 contains information regarding individuals or businesses the user may desire to call. In the case of an individual, business card 6200 includes the individual's name and address, the individual's home, business, and/or cellular telephone numbers, and location icons. The location icons indicate graphically the characteristics representing the location or type of telephone number. In other words, a home icon indicates that the corresponding telephone number is the individual's home telephone number.

Figure 7B:
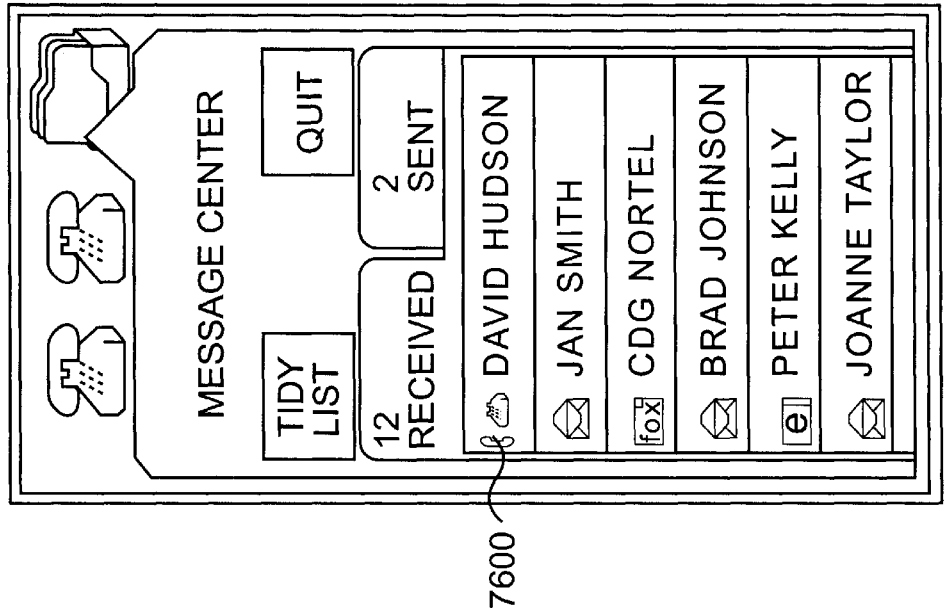
FIGS. 7A and 7B are example displays of received messages.
Figure 7A:
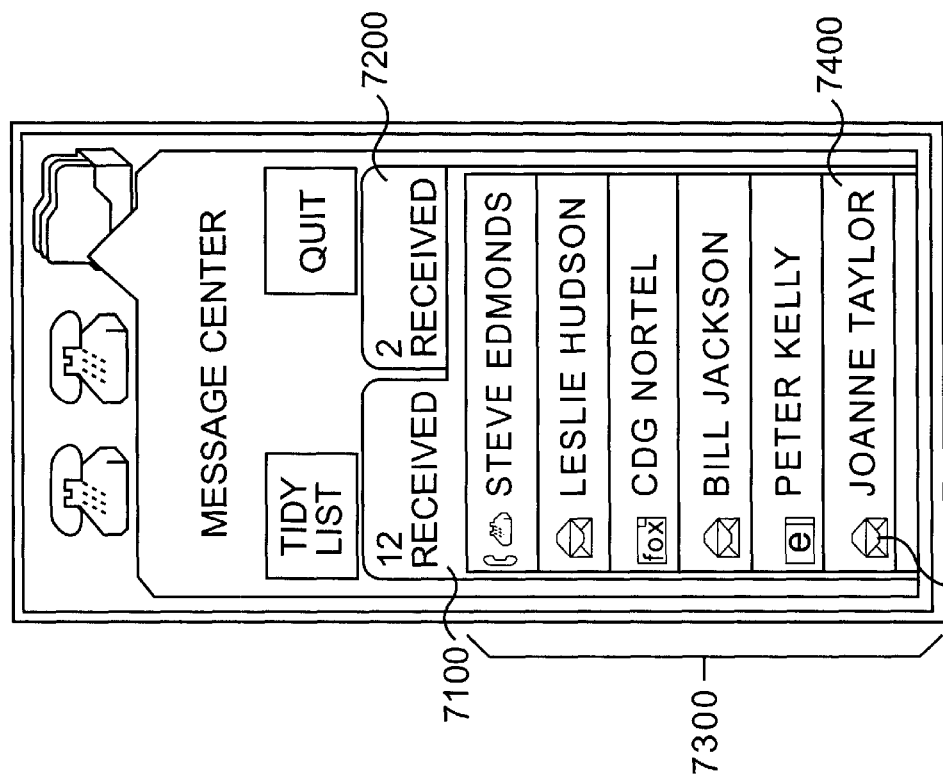

Message center 6100 represents a unified mailbox through which the user is presented with SMS notification messages for all types of received messages, including voice, text, ink, fax, e-mail, etc. To access message center 6100, the user selects the message center icon, for example, simply by pressing it. Once the user selects the message center icon, message center 6100 displays a list of received messages. FIGS. 7A and 7B are examples of typical message center displays.

FIG. 7A is an example display in which message center 6100 presents the user with an indication of the total number of messages received 7100 and sent 7200, and a scrollable, selectable list 7300 of notification headers for all the received messages. Each entry in the scrollable list of notification headers identifies a received message and includes the sender's name 7400 and an identification icon 7500, identifying the type of message. The identification icons include, for example, icons used to identify voice mail, SMS messages, e-mail, and faxes.

Message center 6100 organizes the messages according to user preference. For example, the messages might be arranged alphabetically, chronologically, by message type, or by sender. In addition, the user might specify that each message include a date/time stamp to indicate when the message was received.

If the user desires, message center 6100 will provide more detailed information about any of the received messages before retrieving the actual message. To view the detailed information, the user selects a message from the scrollable list and message center 6100 displays the detailed information corresponding to the selected message. The detailed information might include the sender's home, office, and/or cellular telephone number, a location icon indicating from where the sender sent the message, the sender's e-mail address, the date and time the message was received, etc. Message center 6100 obtains the detailed information from the notification message received from network services provider 1200 or from the directories stored in memory 3400 (FIG. 3).

Once the user reads or listens to a message, message center 6100 marks the message as read/heard. Message center 6100 indicates read/unread, or heard/unheard, status of the messages by using a discernable mark to indicate that the corresponding message has been read or heard. In FIG. 7B, message center 6100 uses a check mark 7600 to indicate that a message has been read or heard.

FIGS. 8A, 8B, 9A, and 9B are examples of screen displays in which the user selects to read an SMS message from a caller using mobile telephone 1400 (FIG. 1). Mobile telephone 1100 stores all received SMS messages in its memory. The SMS messages may be notification messages or the actual messages.

The SMS message could be of several different data types. FIG. 8A is an example of a screen display for a standard SMS text message. The caller enters the text message directly into mobile telephone 1400 using the mobile telephone's keypad or an on-screen keyboard.

Figure 8B:
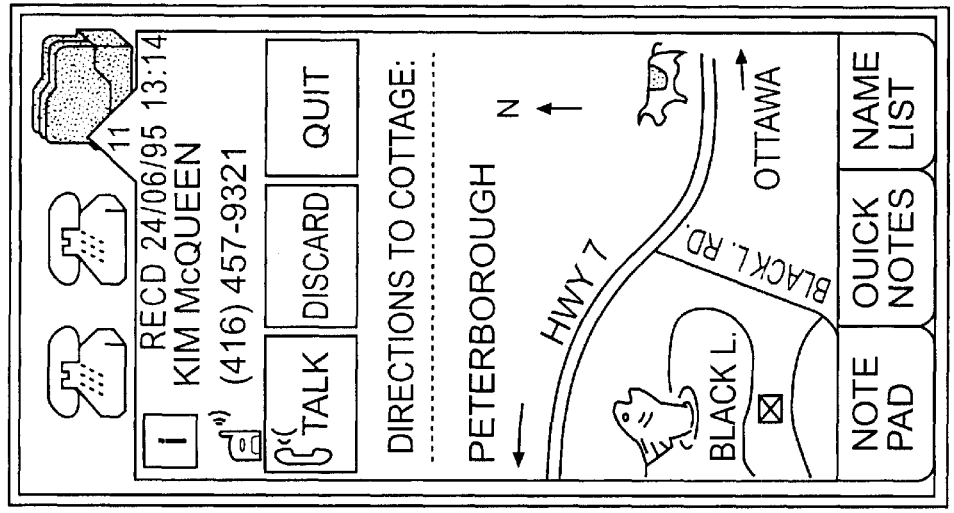
FIG. 8B is an example display of a received electronic ink message.
Figure 8A:
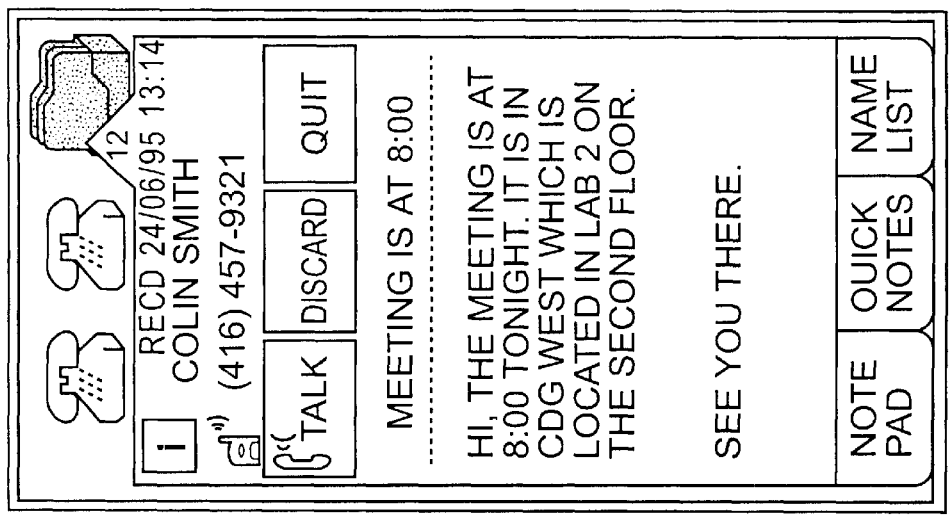
FIG. 8A is an example display of a received SMS text message.

FIG. 8B is an example of a screen display for an electronic ink message. The caller enters the ink message by writing directly on mobile telephone 1400's display. Mobile telephone 1400 bit maps the ink message and converts it into SMS characters for transmission to GSM switching fabric 1800.

Figure 9B:
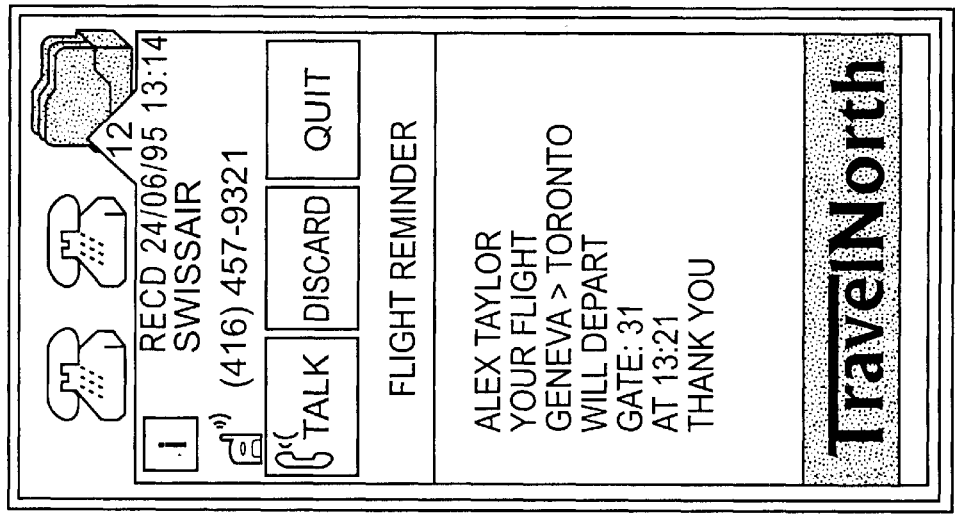
FIGS. 9A and 9B are example displays of SMS text messages with hypertext markup language code.
Figure 9A:
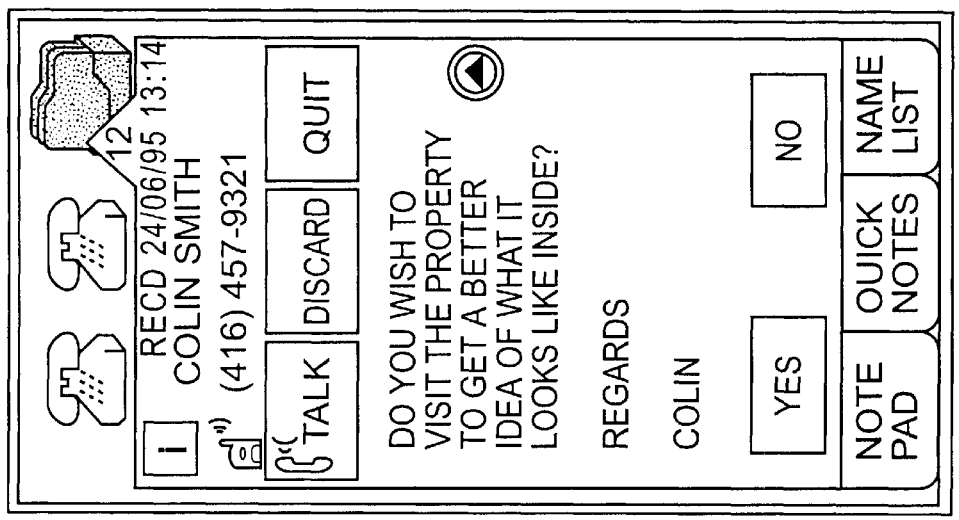

FIGS. 9A and 9B are examples of screen displays for SMS text messages with hypertext markup language (HTML) code. The HTML code permits the caller to insert selection buttons or hot-links into the text message. FIG. 9A is an example of a screen display for a text message that includes two selection buttons. To respond to the text message, the user can simply press the "Yes" or "No" button. FIG. 9B is an example of screen display of a text message that includes a hot-link. By pressing the "TravelNorth" hot-link, mobile telephone 1100 establishes a telephone connection to the TravelNorth company or accesses their web page.

Figure 10:
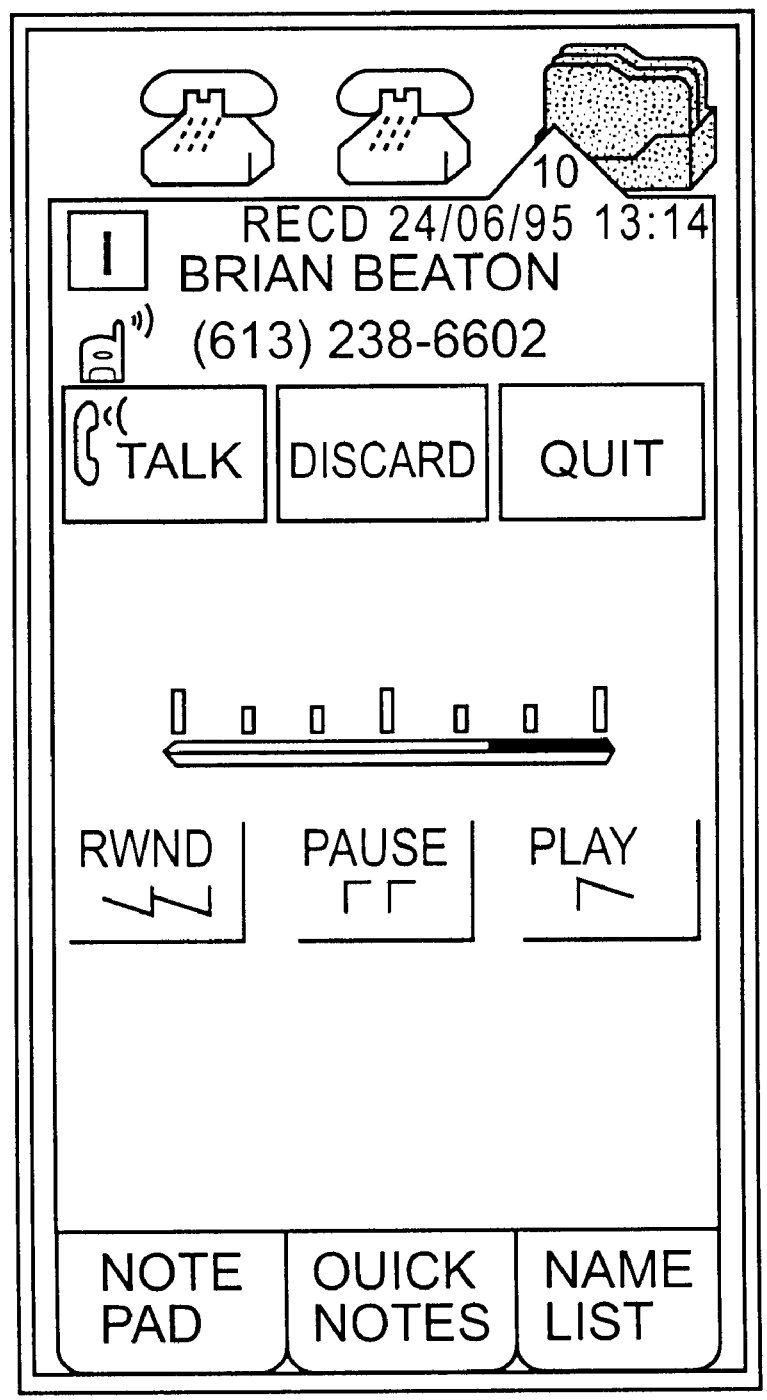
FIG. 10 is an example display in which the user selects to listen to a voice mail message.

FIG. 10 is an example of a screen display in which the user selects to listen to a voice mail message from a caller using telephone 1300 (FIG. 1). Message center 6100 provides a graphical depiction of the SMS voice mail notification message that mobile telephone 1100 received from network services provider 1200. At this point, however, voice mail server 5600 in network services provider 1200 continues to store the actual voice mail message.

Message center 6100 provides all of the conventional voice mail services in graphical form. Some of the voice mail features provided by message center 6100 might include play, skip back, skip ahead, go to previous message, go to next message, call sender, reply to sender, reply to all, delete the message, set external and/or internal greetings, and change password. Message center 6100 additionally provides features for viewing the voice mail notification message and composing, recording, and sending a text message.

When the user wants to listen to the voice mail message after viewing the voice mail notification message, the user selects the voice mail icon corresponding to the voice message from the message center display (FIGS. 7A and 7B). In response, mobile telephone 1100 establishes a connection with network services provider 1200 over the voice B-channel.

The user interacts with voice mail server 5600 using the graphical controls shown in FIG. 10. When the user presses one of the graphical controls, mobile telephone 1100 translates the user's action into corresponding DTMF tones to control voice mail server 5600. For example, when the user presses the "Play" button, mobile telephone 1100 generates a DTMF tone identical to pressing the "2" key on a telephone. Voice mail server 5600 interprets this DTWF tone as an instruction to play back the voice message.

Figure 11:
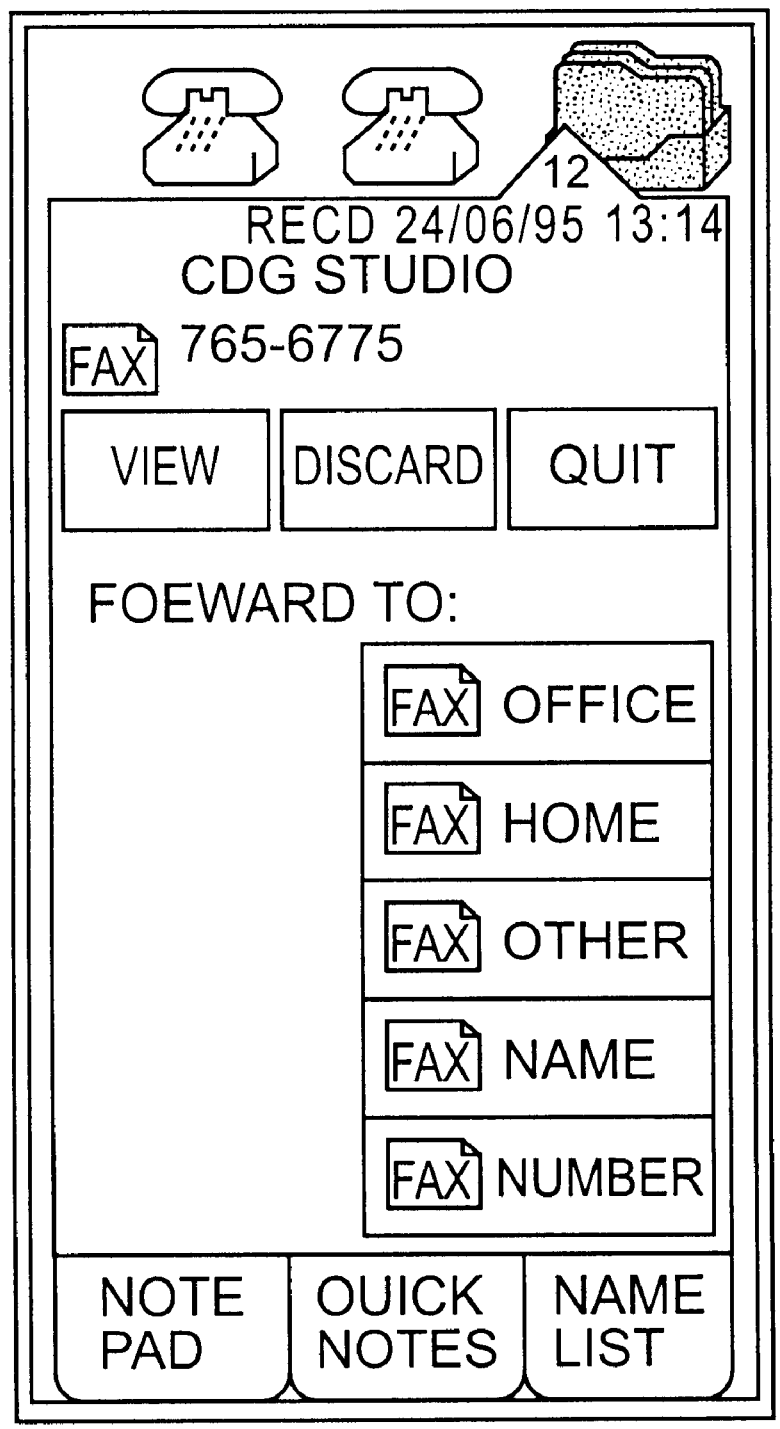
FIG. 11 is an example display in which the user selects to forward a fax.

FIG. 11 is an example of a screen display in which the user wants to retrieve a fax, or fax mail message, from a caller using facsimile equipment 1500 (FIG. 1). Message center 6100 provides a graphical depiction of the SMS fax notification message that mobile telephone 1100 received from network services provider 1200. At this point, however, fax mail server 5700 in network services provider 1200 continues to store the actual contents of the fax.

Message center 6100 permits the user to view the fax notification message, select and view the contents or a portion of the contents of the fax, forward the fax to facsimile equipment, a printer, or a computer, delete the fax, and change the password to fax mail server 5700. FIG. 11 shows that message center 6100 provides the user with graphical controls corresponding to these features.

When the user wants to retrieve the fax after viewing the fax notification message, the user first selects the fax icon corresponding to the fax from the message center display (FIGS. 7A and 7B), and then instructs mobile telephone 1100 to retrieve the fax by pressing the "View" button. In response, mobile telephone 1100 establishes a B-channel connection with network services provider 1200 to download the fax from fax mail server 5700. Display 2400 only displays a portion of the downloaded fax at a time due to display 2400's limited size. Mobile telephone 1100 provides on-screen graphical scroll keys, or hard keys on main housing 2100, to allow the user to scroll horizontally and vertically to view the entire fax.

When the user wants to forward the fax after viewing the fax notification message, the user first selects the fax icon from the message center display, and then presses the graphical button corresponding to the destination location. In response, mobile telephone 1100 establishes a connection with network services provider 1200 and informs fax mail server 5700 where to forward the fax.

Figure 12:
FIG. 12 is an example display of a received e-mail message.

FIG. 12 is an example of a screen display in which the user wants to retrieve e-mail from a caller using computer 1600 (FIG. 1). Message center 6100 provides a graphical depiction of the SMS e-mail notification message that mobile telephone 1100 received from network services provider 1200. At this point, however, e-mail server 5800 in network services provider 1200 continues to store the actual e-mail message. Message center 6100 permits the user to view the e-mail notification message and download the e-mail message from e-mail server 5800.

When the user wants to retrieve the e-mail message after viewing the e-mail notification message, the user first selects the e-mail icon corresponding to the e-mail message from the message center display (FIGS. 7A and 7B), and then instructs mobile telephone 1100 to retrieve the e-mail message by pressing the "View" button. In response, mobile telephone 1100 establishes a connection with network services provider 1200 to download the e-mail message from e-mail server 5800.

Unlike in the case of fax retrieval, e-mail server 5800 reformats the e-mail message for viewing on display 2400. The user scrolls vertically through the e-mail message using on-screen scroll keys or hard keys on main housing 2100.

Message center 6100 allows the user to respond to any type of message by either sending an SMS message or by establishing a voice call to the message sender. FIGS. 13A through 13D, 14A, and 14B are example displays showing the two types of responses.

Figure 13B:
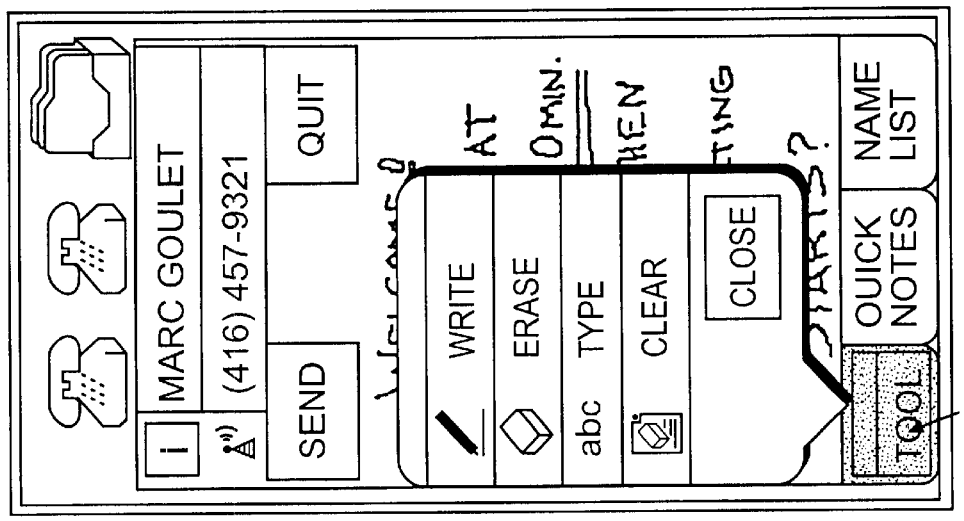
FIGS. 13A through 13D are example displays in which the user responds to an ink message by sending an SMS message.
Figure 13A:
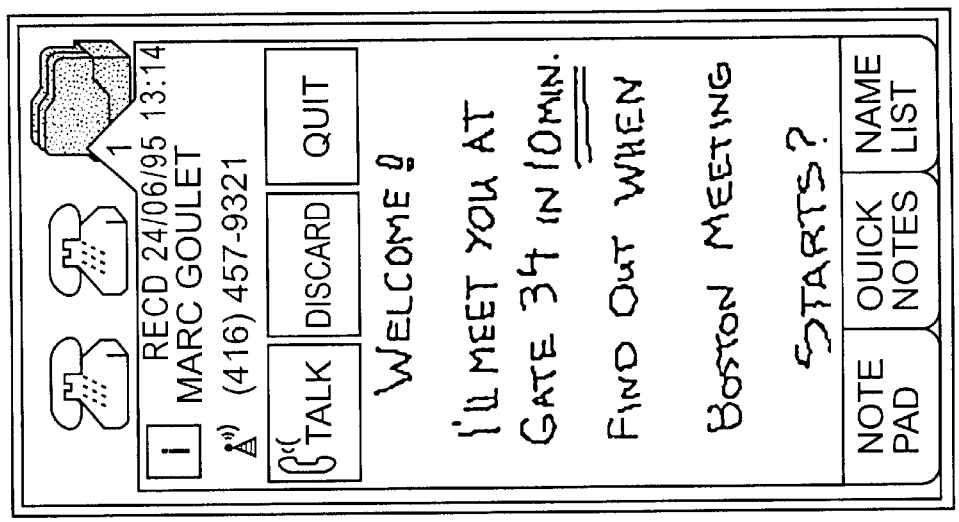

FIGS. 13A though 13D are example displays in which the user responds to an ink message from a message sender by sending an SMS message. FIG. 13A is an example display showing the ink message received from the message sender. In FIG. 13B, the user selects a toolbox menu by pressing the "Tools" button on display 2400. The toolbox menu provides the user with several writing tools: Clear, Type, Erase, and Write. Clear clears the original message from display 2400, Type enables the user to generate a text message using an on-screen keyboard or hard keys, Erase allows the user to erase a portion of the original message from display 2400, and Write enables the user to write an ink message.

Figure 13D:
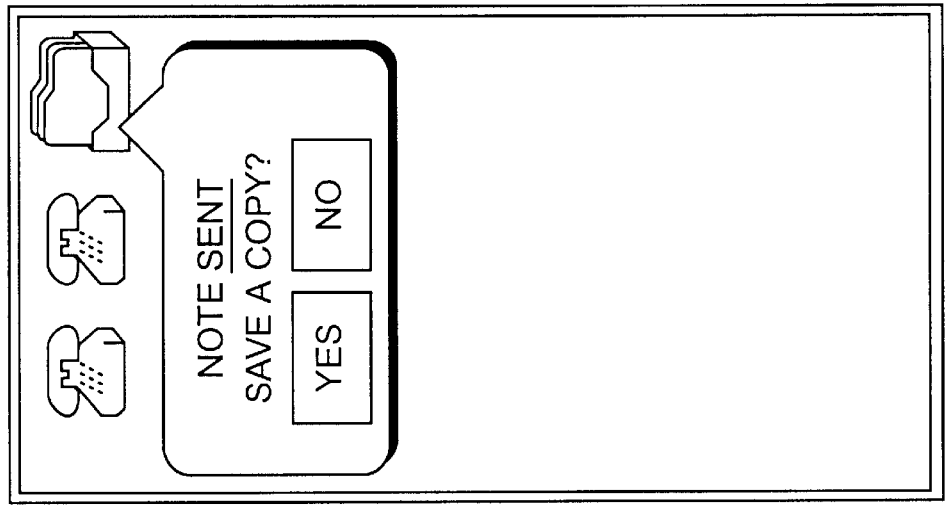
Figure 13C:
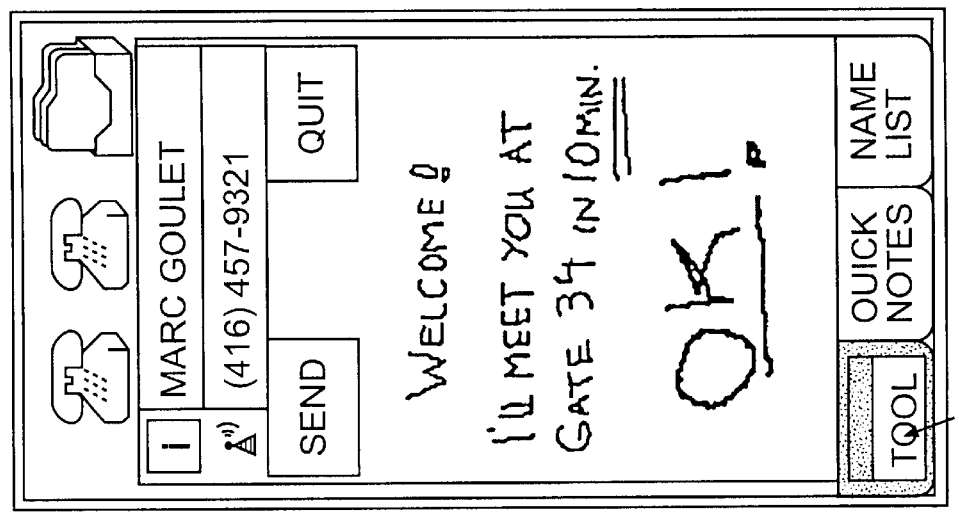

FIG. 13C is an example display of the case in which the user selects Write from the toolbox menu. The user annotates the existing ink message with an ink response and sends it to the message sender by pressing the "Send" button. FIG. 13D is an example display showing that once mobile telephone 1100 sends the response, message center 6100 prompts the user whether the response should be saved. The user can save the response by pressing the "Yes" button.

Figure 14B:
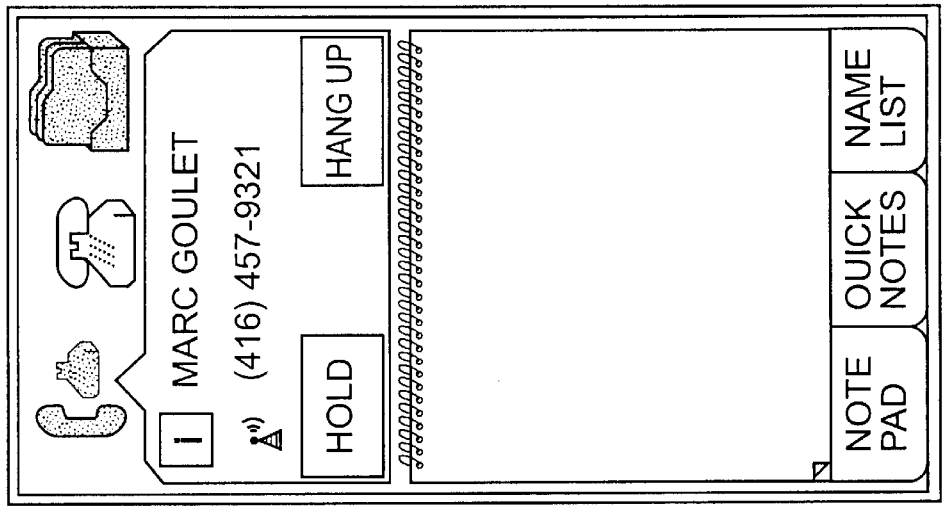
FIGS. 14A and 14B are example displays in which the user responds to an ink message by establishing a voice call.
Figure 14A:
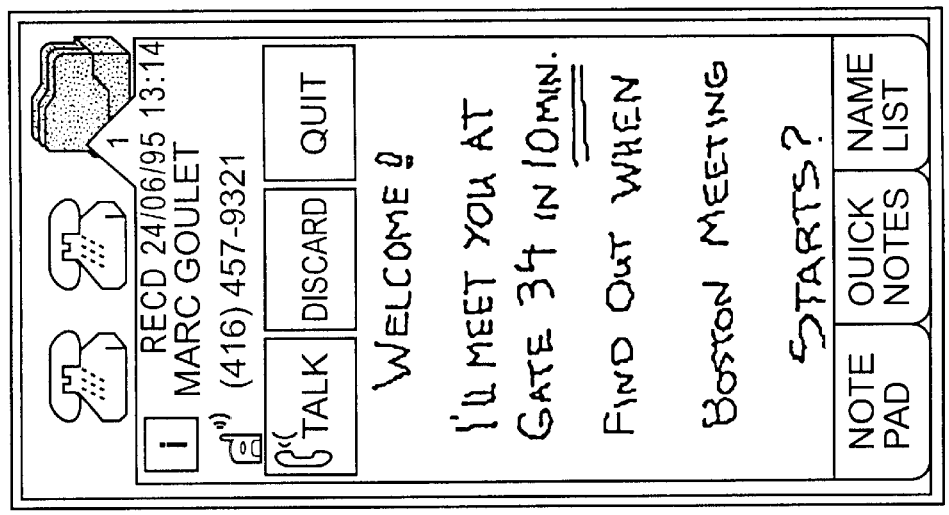

FIGS. 14A and 14B are example displays in which the user responds to the ink message by establishing a voice call to the message sender. FIG. 14A is an example display showing the ink message received from the message sender. To respond to the ink message by calling the message sender, the user presses the "Talk" button on display 2400. FIG. 14B is an example display showing that mobile telephone 1100 automatically dials the message sender in response to selection by the user. Mobile telephone 1100 obtains the message sender's telephone number from the SMS notification message or from the directories stored in memory 3400 (FIG. 3).

Whenever mobile telephone 1100 receives a voice call or an SMS message, message center 6100 presents information regarding the call to the user. Message center 6100 provides sufficient information about the call to permit the user to decide whether to accept the call or send it to the message center for later retrieval. The information presented by message center 6100 might include the type of call, the caller's name, the caller's telephone number, and preferably the location from which the caller placed the call.

Figure 15B:
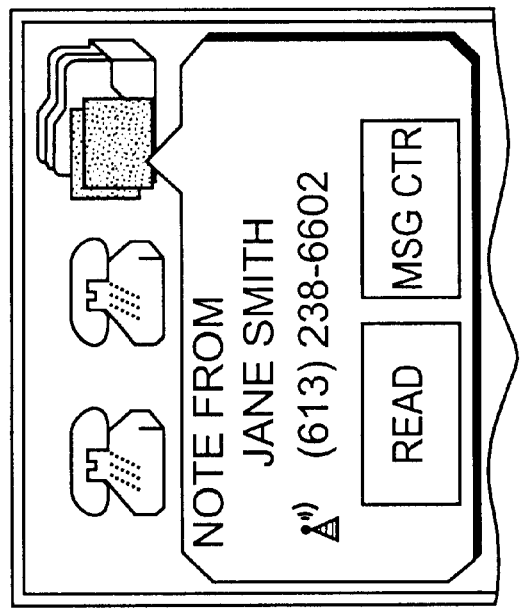
FIGS. 15A and 15B are example displays in which the user receives a voice call and an SMS message, respectively.
Figure 15A:

FIGS. 15A and 15B are example displays in which the user receives a voice call and an SMS message, respectively. FIG. 15A is an example display in which the user presses the "Accept" button to accept the voice call. At this time, the user may speak to the caller. If the user decides, on the other hand, to send the voice call to the message center, the user either presses the "MsgCtr" button or simply does not respond to the voice call for a predetermined period of time. Under either circumstance, the voice call forwards to voice mail server 5600 in network services provider 1200 by conventional mechanisms.

FIG. 15B is an example display in which the user presses the "Read" button to read the SMS message. Message center 6100 displays the SMS message on display 2400 in response. If the user decides, on the other hand, to send the SMS message to the message center, the user either presses the "MsgCtr" button or simply does not respond to the SMS message for a predetermined period of time. Under either circumstance, the SMS message forwards to SMS server 5300 in network services provider 1200 by conventional mechanisms.

Message center 6100 offers many call and message handling features to the user. For example, message center 6100 offers various call forwarding and call filtering features to handle specific calls or specific types of calls in a special manner.

III. Conclusion

The integrated message center according to the principles of the present invention provides an integrated display of different types of messages that can be easily manipulated by a user.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the servers have been described as being located at a single location, namely, the network services provider. However, this need not be the case. The servers could be physically positioned at locations remote from each other, and communicate with an SMS server by modem, for example, to provide the SMS message notification capability.

Additionally, the user has been described as accessing the integrated message center using a mobile telephone. The user could, alternatively, access the integrated message center using other mechanisms, such as a desktop-type unit or a personal computer.

Moreover, the foregoing description detailed specific message center displays, containing various graphical icons and buttons. These displays have been provided as examples only. The foregoing description encompasses obvious modifications to the described message center displays. The scope of the invention is defined by the claims and their equivalents.

What is claimed is:

1. An integrated message center within telecommunications equipment for consolidating messages of different types for viewing and manipulation by a user of the telecommunications equipment having a display and a processor, comprising:

means for automatically receiving notification messages corresponding to pending messages of different types, the notification messages including information regarding the source of each of the pending messages and the type of each of the pending messages, wherein each of the notification messages is automatically sent to the user when one of the pending messages is initially received and wherein the notification messages are received from an interface with independent connections with different bandwidths for the different types of pending messages;

means for determining a message type of the pending messages from the information corresponding to the received notification messages;

means for associating a message type indicator with each of the received notification messages based on the determined message type;

means for displaying on the display a portion of the received notification messages and the associated message type indicators as entries in a single selectable list;

means for receiving a selection of one of the pending messages based on the entries in the single selectable list; and means for retrieving manipulating the selected pending message for viewing and manipulation by the user.

2. The integrated message center of claim 1, further including means for displaying on the display detailed information about a sender of the selected pending message upon direction from the user.

3. The integrated message center of claim 2, wherein the means for displaying detailed sender information includes
    means for displaying at least one of sender home telephone number data, sender business telephone number data, sender cellular telephone number data, sender e-mail address data, and sender fax number data.

4. The integrated message center of claim 1, wherein the message type indicator is a graphical icon, and wherein the displaying means includes
    means for displaying one of the portions of the received notification messages and the associated graphical icon as a single entry in the single selectable list.

5. The integrated message center of claim 4, wherein each of the notification message portions includes an identification of a sender of the corresponding pending message, and wherein the displaying means includes
    means for displaying a sender identification and the associated graphical icon as a single entry in the single selectable list.

6. The integrated message center of claim 1, wherein each of the notification message portions includes an identification of a sender of the corresponding pending message, and wherein the displaying means includes
    means for displaying a sender identification and the associated message type indicator as a single entry in the single selectable list.

7. The integrated message center of claim 1, wherein the retrieving means includes
    means for accessing an external mail server, and
    means for retrieving the selected pending message from the external mail server.

8. A method for consolidating messages of different types for viewing and manipulation by a user of telecommunications equipment having display and a processor, comprising the steps, executed by the telecommunications equipment, of:
    automatically receiving notification messages corresponding to pending messages of different types, the notification messages including information regarding the source of each of the pending messages and the type of each of the pending messages, wherein each of the notification messages is automatically sent to the user when one of the pending messages is initially received and wherein the notification messages are received from an interface with independent connections with different bandwidths for the different types of pending messages;
    determining a message type of the pending messages from the information corresponding to the received notification messages;
    associating a message type indicator with each of the received notification messages based on the determined message type;
    displaying on the display portions of the received notification messages and the associated message type indicators as entries in a single selectable list;
    receiving a selection of one of the pending messages from the entries in the single selectable list; and
    retrieving the selected pending message for viewing and manipulation by the user.

9. The method of claim 8, wherein the message type indicator is a graphical icon, and wherein the displaying step includes the substep of
    displaying one of the portions of the received notification messages and the associated graphical icon as a single entry in the single selectable list.

10. The method of claim 9, wherein each of the notification message portions includes an identification of a sender of the corresponding pending message, and wherein the displaying step includes the substep of
    displaying a sender identification and the associated graphical icon as a single entry in the single selectable list.

11. The method of claim 8, wherein each of the notification message portions includes an identification of a sender of the corresponding pending message, and wherein the displaying step includes the substep of
    displaying a sender identification and the associated message type indicator as a single entry in the single selectable list.

12. The method of claim 8, further comprising the step of
    displaying detailed information about a sender of the selected pending message upon direction from the user.

13. The method of claim 8, wherein the retrieving step includes the substeps of
    accessing an external mail server, and
    retrieving the selected pending message from the external mail server.

14. A network services provider for notifying a user of received messages, comprising:
    a plurality of mail servers for receiving messages of different types from a plurality of message senders over a communications network, the mail servers store the received messages and generate notification signals in response to receipt of new messages;
    a short message generator for receiving the notification signals from the mail servers, generating notification messages from the notification signals, and automatically transmitting the notification messages to the user, each of the notification messages including information regarding the message sender and a message type of the received message, wherein the notification messages provide the user with a single selectable list; and
    an interface for processing with independent connections with different bandwidths for the different types of received messages.

15. The network services provider of claim 14, wherein one of the mail servers includes
    a voice mail server for processing voice mail,
    a fax mail server for processing faxes, and
    an e-mail server for processing e-mail.

16. The network services provider of claim 14, wherein at least one of the mail servers includes
    a remote mail server remotely located from the short message generator, the remote mail server communicating the notification signals to the short message generator via modem.

17. The network services provider of claim 14, wherein the short message generator includes
    a Short Message Service (SMS) server configured to generate SMS notification messages from the notification signals from the mail servers.

18. The network services provider of claim 14, further comprising
    an interworking function server connected to the mail servers and configured to perform data conversions on the messages received by the mail servers.

19. The network services provider of claim 14, further comprising
    a terminal rate adapter unit connected to one of the mail servers and configured to perform encoding and decoding on the messages received by the one mail server.

20. The network services provider of claim 14, wherein the short message generator includes means for relaying notes received from the communications network to the user.

21. User equipment for notifying a user of pending messages, comprising:

a display screen;

an input device;

a receiver for automatically receiving voice calls and notification messages corresponding to pending messages of different types, each of the notification messages indicating an identity of a sender and message type of the corresponding pending message, wherein the notification messages are received from an interface with independent connections with different bandwidths for different types of pending messages;

memory; and a processor including means for associating a message type indicator with each of the received notification messages based on the message type of the corresponding pending message, means for displaying on the display screen an identification of the sender and the associated message type indicator for each of the received notification messages as entries in a single selectable list to allow the user to select one of the pending messages from the single selectable list for viewing, and means for directing the display screen to display detailed information about the sender of the selected pending message in response to selection by the user.

22. The user equipment of claim 21, wherein the processor further includes means for retrieving the selected pending message for viewing and manipulation by the user.

23. The user equipment of claim 22, wherein the retrieving means includes means for accessing an external mail server, and means for retrieving the selected pending message from the external mail server.

24. The user equipment of claim 21, wherein the message type indicator is a graphical icon, and wherein the displaying means includes means for displaying each of the sender identification and the associated graphical icons as separate entries in the single selectable list.

25. The user equipment of claim 21, wherein the directing means includes means for displaying the detailed sender information for the selected pending message only upon direction from the user.

26. The user equipment of claim 21, wherein the means for displaying the detailed sender information includes means for directing the display screen to display at least one of sender home telephone number data, sender business telephone number data, sender cellular telephone number data, sender e-mail address data, and sender fax number data.

27. A communications network comprising:

a network services provider, connected to a switching network, for notifying a user of pending messages, the network services provider comprising a mail server for receiving pending messages of different types from a plurality of message senders over the switching network, the mail server stores the pending messages and generates notification signals in response to receipt of new pending messages, a short message generator for receiving the notification signals from the mail server, generating notification messages from the notification signals, and automatically transmitting the notification messages to the switching network, the notification messages including information regarding the message sender and a message type of a corresponding pending message;

an interface with independent connections with different bandwidths for the different types of received messages; and user equipment, connected to the switching network, for informing the user of the pending messages received by the mail server, the user equipment comprising means for receiving the notification messages from the short message generator and the interface, means for associating a message type indicator with each of the received notification messages based on the message type of the corresponding pending message, means for displaying portions of the received notification messages and the associated message type indicators as entries in a single selectable list, means for selecting one of the pending messages for viewing based on the entries in the single selectable list, and means for retrieving the selected pending message from the mail server for viewing and manipulation by the user.

28. The communications network of claim 27, wherein the user equipment further includes means for displaying detailed information about the message sender of the selected pending message upon direction of the user.

29. The communications network of claim 27, wherein the switching network includes a GSM network.

30. The communications network of claim 27, wherein the mail server includes a plurality of mail servers each for processing different types of the received pending messages.

31. The communications network of claim 30, wherein one of the mail servers includes a voice mail server for processing voice mail, a fax mail server for processing faxes, and an e-mail server for processing e-mail.

32. The communications network of claim 27, wherein the user equipment includes a mobile telephone.

33. A method for notifying a user of messages received at network equipment comprising:

receiving messages of different types from a plurality of message senders over a communication network;

generating notification messages based on the received messages, each of the notification messages including information regarding the message sender and a message type of the received message, wherein the notification messages are received from an interface with independent connections with different bandwidths for the different types of the plurality of message senders; and automatically transmitting notification messages to the user, wherein the notification messages provide the user with a single selectable list.

* * * * *